United States Patent [19]

Hunter, Jr. et al.

[11] 4,302,062
[45] Nov. 24, 1981

[54] TURBINE BLADE SUPPORT

[75] Inventors: Alexander D. Hunter, Jr., Madison; William T. Dennison, East Hartford, both of Conn.

[73] Assignee: United Technologies Corporation, Hartford, Conn.

[21] Appl. No.: 77,459

[22] Filed: Sep. 20, 1979

[51] Int. Cl.³ .................... F16C 19/52; F16C 32/00
[52] U.S. Cl. ................................ 308/22; 308/178; 308/DIG. 14
[58] Field of Search ............... 308/15, 22, 27, 58, 308/178, 189 R, DIG. 14, DIG. 15

[56] References Cited

U.S. PATENT DOCUMENTS

| | | | |
|---|---|---|---|
| 1,765,978 | 6/1930 | Isbell | 308/178 |
| 1,888,475 | 11/1932 | Schmitz | 308/22 |
| 2,724,621 | 11/1955 | Kenney, Jr. | 308/15 |
| 2,829,014 | 4/1958 | May | 308/15 |
| 2,919,888 | 1/1960 | Simmons | 308/22 |
| 3,084,003 | 4/1963 | Matt et al. | 308/22 |
| 3,540,784 | 11/1970 | Feix | 308/189 R |

*Primary Examiner*—Richard R. Stearns
*Attorney, Agent, or Firm*—Charles A. Warren

[57] ABSTRACT

A mounting structure for the bearing in a hot part of a gas turbine engine that will permit thermal expansion of the bearing and its supporting ring with relation to the surrounding stationary and supporting part of the engine case without overstressing the several parts and still maintain concentricity of the bearing within this stationary support structure. This is accomplished by radially extending bosses on one part engaging slideably in radial recesses in the cooperating part.

6 Claims, 3 Drawing Figures

TURBINE BLADE SUPPORT

BACKGROUND OF THE INVENTION

In the hot area of the turbine engine such as the bearing support structure downstream of the turbine there are severe thermal differences between the hot exhaust case and the bearing within and supported by the exhaust case. These differentials may be as great as 1000° F. It is necessary to maintain concentricity of the bearing and its support structure in spite of these differentials and to minimize thermal stresses within any of the elements and between the several elements.

SUMMARY OF THE INVENTION

A feature of the present invention is a support system for the bearing support ring within the surrounding fixed structure so as to permit relative expansion therebetween. Another feature is an arrangement of the bearing support ring to minimize thermal stresses therein and also to minimize changes in dimension and shape of the inner periphery that supports the bearing.

According to the invention the bearing is supported on the inner periphery of the support ring and the outer periphery has several radial recesses therein to receive radially extending bosses on the surrounding structure that are slideable in the recesses to permit relative expansion of the ring within the surrounding structure. These recesses are shaped to minimize thermal stresses within the support ring and the engaging surfaces on the bosses have hardened wear surfaces for durability.

The foregoing and other objects, features, and advantages of the present invention will become more apparent in the light of the following detailed description of preferred embodiments thereof as illustrated in the accompanying drawing.

DETAILED DESCRIPTION OF THE INVENTION

Figure 1:
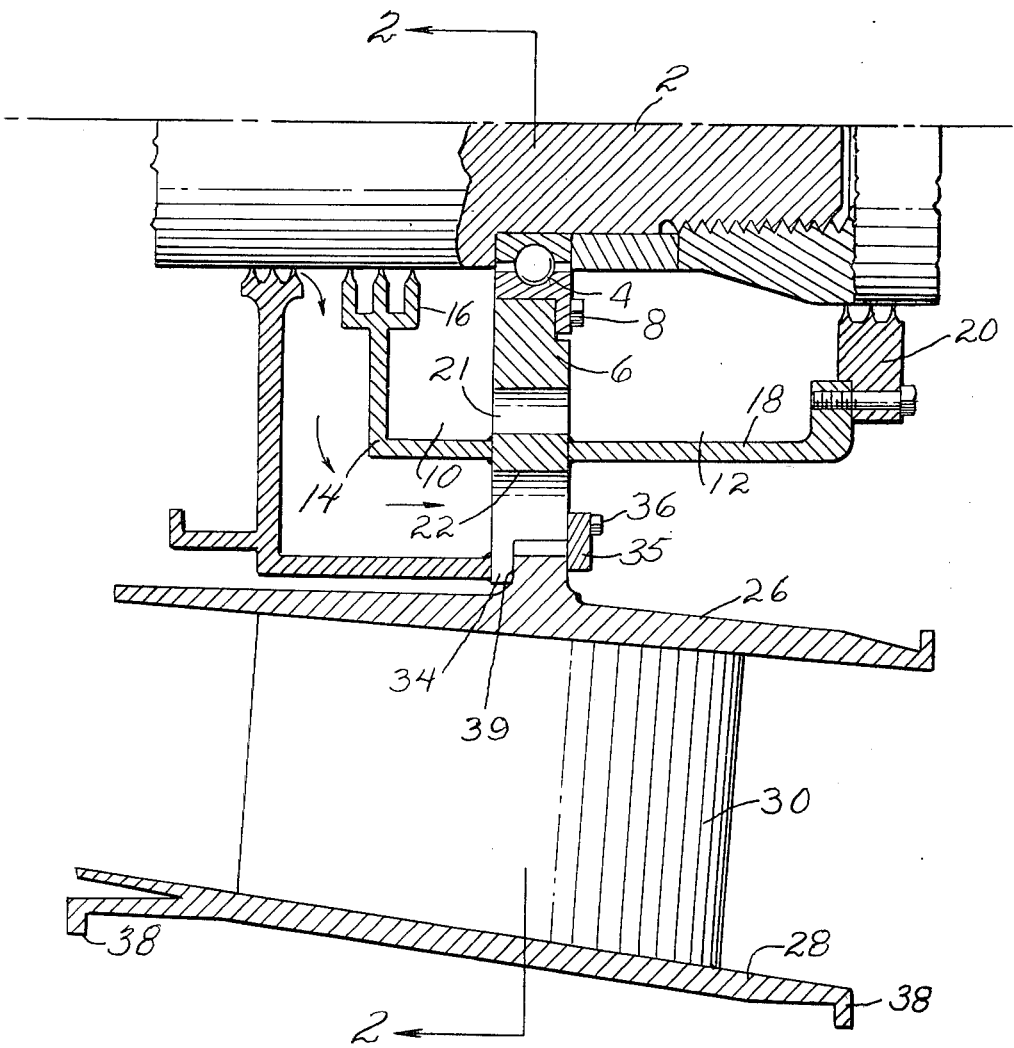
FIG. 1 is an axial sectional view through the bearing support structure.
Figure 2:
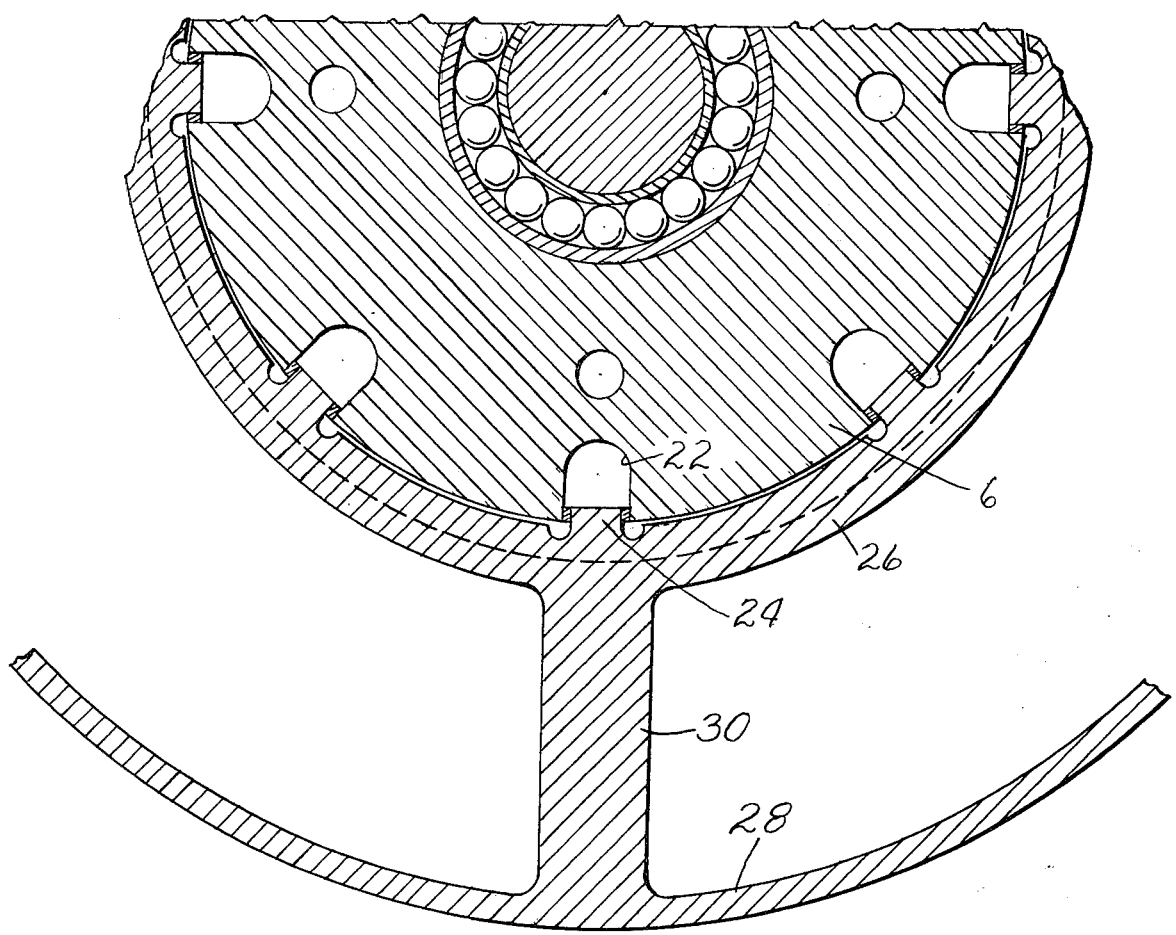
FIG. 2 is a transverse sectional view along the line 2—2 of FIG. 1 through the bearing and support structure.
Figure 3:
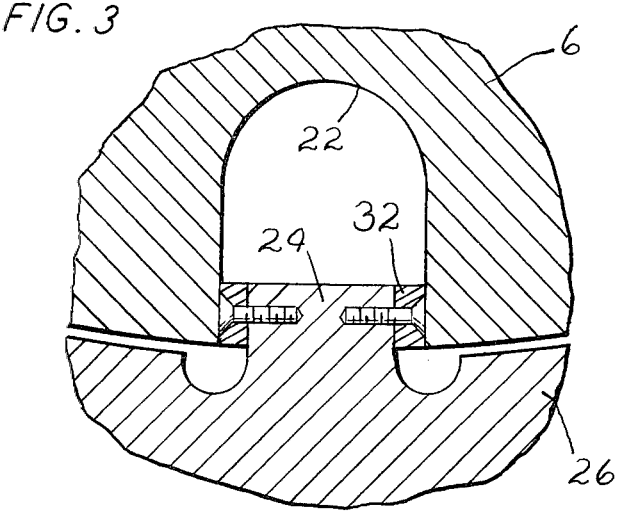
FIG. 3 is an enlarged sectional view of one of the sliding supports.

The invention is intended for use in the hot area of a gas turbine engine. Referring to FIG. 1, the shaft 2 for the gas turbine is supported by a bearing member 4 mounted in the inner periphery of a support ring 6 to which the bearing member 4 is bolted as at 8. The bearing member fits securely in the support ring and its thermal expansion is affected by that of the support ring.

Oil compartments 10 and 12 on opposite sides of the support ring 6 are created by a ring 14 welded to the upstream side of the support ring 6 and having at its inner edge a labyrinth seal 16 closely spaced from the shaft 2 and enclosing compartment 10. Compartment 12 is created by another ring 18 also welded to the support ring 6 on the downstream side and having a labyrinth seal 20 on its outer end. One or more passages 21 in the support ring 6 permits flow of oil between the compartments. The compartments 10 and 12 are relatively large and thus provide for significant cooling of the support ring by the quantity of oil therein. This becomes critical because of the thermal gradient within the ring itself which may be as much as 700° between the inner and outer surfaces.

The outer surface of the support ring is essentially circular and has scalloped shaped recesses 22 therein to receive projecting bosses 24 extending inwardly from the inner wall element 26 of the gas flow path to the turbine. The inner wall is spaced from and supported from the outer wall element 28 by support struts 30 extending across the gas path, these struts being desirably streamlined. The inner periphery of the inner wall 26 is radially spaced from the outer periphery of the support ring for thermal expansion. Both these peripheral surfaces are desirably circular.

The bosses have their opposite side surfaces parallel to each other and the opposite side surfaces of the recesses are also parallel. The inner ends of the recesses are arcuate as shown and both bosses and recesses extend radially of the device. The depth of the recesses is such that the bosses will not bottom in the recesses under the most extreme operating conditions of the engine.

The scalloped shape of the recesses and the depth of these recesses in the ring are useful in preventing the inner periphery of the ring from being pulled away from the bearing by reducing the radial thermal gradients in the ring. The effect of these bosses and recesses and the clearance between the support ring and the surrounding structure is to permit relative expansion but at all times to maintain precise concentricity of the bearing within the surrounding structure. With a multiplicity of these bosses and recesses spaced circumferentially it will be clear that the concentricity will be maintained regardless of the respective temperatures of the several elements.

The bosses preferably have wear elements 32 of a suitable hardened material bolted to opposite sides circumferentially so that movement of the bosses relative to the recesses will not cause excessive wear. With this arrangement thermal growth of the support ring 6 will not be restricted in any way by the surrounding structure since it can move radially with respect thereto. Obviously the scallop shaped recess is deep enough so that the inner end of the bosses does not reach the base of the scallop.

For limiting relative axial movement between the support ring and its surrounding structure the circumferential material remaining between the recesses forms a thrust shoulder 34 for engagement with a shoulder 39 located on the inner wall 26 to limit rearward movement of the support ring. Forward movement is limited by a thrust ring 35 bolted at 36 to the rearward surface of the support ring. The effect of this structure is to permit relative thermal expansion of the support ring 6 within the support structure without stressing any of the parts and thereby minimize thermal distortion in the region of the bearing. This structure is particularly advantageous during transient conditions.

It will be understood that the outer wall element of the gas path has attachment flanges 38 at opposite ends for attachment to other parts of the outer wall structure of the engine and that the bearing structure is supported in this way within the engine. The bearing structure described is that downstream of the turbine rotor and the gas passing through the support structure is the exhaust gas from the turbine.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A bearing support device for a gas turbine engine including:
   a support structure forming part of the stationary part of the engine and including outer and inner wall elements;
   inwardly extending bosses on the inner wall element; and
   a bearing support ring within and spaced from said support structure, said ring having circumferentially spaced recesses to receive the bosses and constructed for radial movement of the bosses in the recesses to permit relative radial expansion, the bases of the recesses being scallop-shaped.

2. A device as in claim 1 in which the bosses have parallelly extending surfaces on opposite edges and the bosses and recesses extend radially of the support ring.

3. A device as in claim 1 in which the inner surface of the support structure and the outer surface of the bearing support ring are circular and radially spaced from each other.

4. A bearing support device including:
   a bearing for a turbine shaft;
   a support ring to which the bearing is secured;
   a support structure for the ring having a plurality of circumferentially spaced inwardly extending bosses on its inner surface, said ring having a plurality of circumferentially spaced recesses to accept the bosses, said bosses and recesses extending radially and having cooperating parallel surfaces on opposite edges to permit relative radial movement therebetween resulting from thermal expansion, the bases of the recesses being scallop-shaped.

5. A device as in claim 4 in which the parallel surfaces on one of either the bosses or recesses have hardened wear surfaces.

6. A device as in claim 4 in which radial clearance is provided between the ring and the support structure to allow for thermal expansion, the bosses and recesses maintaining concentricity between the ring and the surrounding structure.

* * * * *

UNITED STATES PATENT AND TRADEMARK OFFICE
CERTIFICATE OF CORRECTION

PATENT NO. : 4,302,062
DATED : November 24, 1981
INVENTOR(S) : ALEXANDER D. HUNTER, JR. ET AL It is certified that error appears in the above—identified patent and that said Letters Patent is hereby corrected as shown below:

On Page 1, the title "TURBINE BLADE SUPPORT" should read

--TURBINE BEARING SUPPORT STRUCTURE--.

Signed and Sealed this

Fourth Day of May 1982

[SEAL]

*Attest:*

GERALD J. MOSSINGHOFF

*Attesting Officer* — *Commissioner of Patents and Trademarks*